(12) United States Patent
Takeda et al.

(10) Patent No.: US 8,565,190 B2
(45) Date of Patent: *Oct. 22, 2013

(54) NAT TRAVERSAL FOR MOBILE NETWORK DEVICES

(75) Inventors: Yutaka Takeda, San Mateo, CA (US);
Payton R. White, Foster City, CA (US);
James E. Marr, Burlingame, CA (US);
Stephen C. Detwiler, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 13/093,624

(22) Filed: Apr. 25, 2011

(65) Prior Publication Data

US 2011/0200009 A1    Aug. 18, 2011

Related U.S. Application Data

(63) Continuation of application No. 11/829,831, filed on Jul. 27, 2007, now Pat. No. 7,933,273.

(51) Int. Cl.
*H04L 12/28* (2006.01)
*H04L 12/56* (2011.01)
*H04W 4/00* (2009.01)

(52) U.S. Cl.
USPC ............ 370/331; 370/395; 370/401; 709/245

(58) Field of Classification Search
USPC .................. 370/331–352, 401–409, 452–466; 709/228–245, 247–249
See application file for complete search history.

(56) References Cited

U.S. PATENT DOCUMENTS

| 5,488,608 A | 1/1996 | Flammer, III |
| 5,636,216 A | 6/1997 | Fox et al. |
| 5,793,763 A | 8/1998 | Mayes et al. |

(Continued)

FOREIGN PATENT DOCUMENTS

| CN | 1152383 | 6/1997 |
| JP | 2006-295909 | 10/2006 |

(Continued)

OTHER PUBLICATIONS

Advisory Action dated Nov. 15, 2010 issued for U.S. Appl. No. 12/235,438.

(Continued)

*Primary Examiner* — M. Phan
(74) *Attorney, Agent, or Firm* — Joshua D. Isenberg; JDI Patent

(57) ABSTRACT

Traversal of a Network Address Translator (NAT) can be facilitated for a mobile device configured to communicate with one or more other devices over a network via one or more wireless access points. A direction of travel can be estimated for the mobile device. One or more wireless access points the mobile device is likely to encounter can be predicted using the estimated direction of travel. Information regarding behavior of one or more NATs associated with the predicted wireless access point(s) can be predicted. Such information can be stored in such a way that the information is retrievable by one or more other devices or using the information to traverse one or more of the NATs. Alternatively, information can be retrieved regarding behavior of one or more NATs associated with the predicted wireless access points. This information can be used to traverse one or more of the NATs.

24 Claims, 5 Drawing Sheets

(56) References Cited

U.S. PATENT DOCUMENTS

| | | | |
|---|---|---|---|
| 5,956,485 A | 9/1999 | Perlman | |
| 6,058,431 A | 5/2000 | Srisuresh et al. | |
| 6,128,623 A | 10/2000 | Mattis et al. | |
| 6,128,624 A | 10/2000 | Papierniak et al. | |
| 6,128,627 A | 10/2000 | Mattis et al. | |
| 6,128,664 A | 10/2000 | Yanagidate et al. | |
| 6,138,156 A | 10/2000 | Fletcher et al. | |
| 6,151,584 A | 11/2000 | Papierniak et al. | |
| 6,151,601 A | 11/2000 | Papierniak et al. | |
| 6,208,649 B1 | 3/2001 | Kloth | |
| 6,209,003 B1 | 3/2001 | Mattis et al. | |
| 6,212,565 B1 | 4/2001 | Gupta | |
| 6,289,358 B1 | 9/2001 | Mattis et al. | |
| 6,292,880 B1 | 9/2001 | Mattis et al. | |
| 6,333,931 B1 | 12/2001 | LaPier et al. | |
| 6,353,891 B1 | 3/2002 | Borella et al. | |
| 6,389,462 B1 | 5/2002 | Cohen et al. | |
| 6,393,488 B1 | 5/2002 | Araujo | |
| 6,535,511 B1 | 3/2003 | Rao | |
| 6,581,108 B1 | 6/2003 | Denison et al. | |
| 6,618,757 B1 | 9/2003 | Babbitt et al. | |
| 6,636,898 B1 | 10/2003 | Ludovici et al. | |
| 6,661,799 B1* | 12/2003 | Molitor | 370/401 |
| 6,779,035 B1 | 8/2004 | Gbadegesin | |
| 6,789,126 B1 | 9/2004 | Saulpaugh et al. | |
| 6,799,255 B1 | 9/2004 | Blumenau et al. | |
| 6,993,012 B2* | 1/2006 | Liu et al. | 370/352 |
| 7,016,942 B1 | 3/2006 | Odom | |
| 7,107,348 B2 | 9/2006 | Shimada et al. | |
| 7,133,368 B2 | 11/2006 | Zhang et al. | |
| 7,155,518 B2 | 12/2006 | Forslow | |
| 7,216,359 B2 | 5/2007 | Katz et al. | |
| 7,254,709 B1 | 8/2007 | Richard | |
| 7,302,496 B1* | 11/2007 | Metzger | 709/245 |
| 7,328,280 B2* | 2/2008 | Takeda et al. | 709/245 |
| 7,536,467 B2 | 5/2009 | Guo | |
| 7,543,064 B2 | 6/2009 | Juncker | |
| 7,590,758 B2* | 9/2009 | Takeda et al. | 709/245 |
| 7,620,033 B2 | 11/2009 | Chu | |
| 7,933,273 B2* | 4/2011 | Takeda et al. | 370/400 |
| 8,060,626 B2* | 11/2011 | Roy et al. | 709/228 |
| 8,224,985 B2* | 7/2012 | Takeda | 709/237 |
| 2002/0016826 A1 | 2/2002 | Johansson et al. | |
| 2002/0075844 A1 | 6/2002 | Hagen | |
| 2002/0143855 A1 | 10/2002 | Traversat et al. | |
| 2003/0009561 A1 | 1/2003 | Sollee | |
| 2003/0051052 A1 | 3/2003 | Shteyn et al. | |
| 2003/0055978 A1 | 3/2003 | Collins | |
| 2003/0135625 A1 | 7/2003 | Fontes et al. | |
| 2004/0024879 A1 | 2/2004 | Dingman et al. | |
| 2004/0139228 A1 | 7/2004 | Takeda et al. | |
| 2004/0249891 A1 | 12/2004 | Khartabil et al. | |
| 2005/0044247 A1 | 2/2005 | Bar-Zakai | |
| 2005/0105526 A1 | 5/2005 | Stiemerling | |
| 2005/0114728 A1 | 5/2005 | Aizawa et al. | |
| 2005/0149481 A1 | 7/2005 | Hesselink et al. | |
| 2005/0201391 A1* | 9/2005 | Ma et al. | 370/401 |
| 2005/0251577 A1 | 11/2005 | Guo et al. | |
| 2005/0259637 A1 | 11/2005 | Chu et al. | |
| 2006/0075127 A1 | 4/2006 | Juncker et al. | |
| 2006/0120293 A1 | 6/2006 | Wing | |
| 2006/0209822 A1 | 9/2006 | Hamamoto et al. | |
| 2006/0288103 A1 | 12/2006 | Gobara et al. | |
| 2007/0014301 A1* | 1/2007 | Miller et al. | 370/401 |
| 2007/0036143 A1* | 2/2007 | Alt et al. | 370/352 |
| 2007/0058792 A1 | 3/2007 | Chaudhari et al. | |
| 2007/0061460 A1 | 3/2007 | Khan et al. | |
| 2007/0076094 A1 | 4/2007 | Dickerson | |
| 2007/0076099 A1 | 4/2007 | Dickerson et al. | |
| 2007/0076729 A1 | 4/2007 | Takeda | |
| 2007/0110054 A1* | 5/2007 | Kozakai et al. | 370/389 |
| 2007/0150552 A1 | 6/2007 | Harris et al. | |
| 2007/0165629 A1 | 7/2007 | Chaturvedi et al. | |
| 2007/0191109 A1 | 8/2007 | Crowder et al. | |
| 2007/0208748 A1 | 9/2007 | Li | |
| 2007/0217436 A1 | 9/2007 | Markley et al. | |
| 2008/0120404 A1 | 5/2008 | Sakai | |
| 2008/0198850 A1 | 8/2008 | Cooper | |
| 2009/0077245 A1 | 3/2009 | Smelyansky | |
| 2009/0138610 A1 | 5/2009 | Gobara et al. | |
| 2009/0180476 A1* | 7/2009 | Lee et al. | 370/392 |
| 2009/0240821 A1 | 9/2009 | Juncker et al. | |

FOREIGN PATENT DOCUMENTS

| | | |
|---|---|---|
| JP | 2007-60281 | 3/2007 |
| WO | WO 99/35799 | 7/1999 |
| WO | WO 01/97485 | 12/2001 |
| WO | WO 02/03217 | 1/2002 |
| WO | WO 02/23822 | 3/2002 |
| WO | WO2004/063843 | 7/2004 |
| WO | WO2005/088466 | 9/2005 |

OTHER PUBLICATIONS

Final Office Action dated Sep. 9, 2010 issued for U.S. Appl. No. 11/708,988.

Final Office Action dated Aug. 31, 2010 issued for U.S. Appl. No. 12/235,438.

Office Action dated Aug. 31, 2010 issued for U.S. Appl. No. 11/243,853.

Final Office Action dated Jul. 19, 2010 issued for U.S. Appl. No. 12/235,409.

Office Action dated Jun. 4, 2009 issued for U.S. Appl. No. 10/215,899.

Office Action dated Nov. 7, 2008 issued for U.S. Appl. No. 10/215,899.

Office Action dated Mar. 13, 2008 issued for U.S. Appl. No. 10/215,899.

Office Action dated Sep. 11, 2007 issued for U.S. Appl. No. 10/215,899.

Office Action dated Mar. 22, 2007 issued for U.S. Appl. No. 10/215,899.

Office Action dated Aug. 12, 2005 issued for U.S. Appl. No. 10/215,899.

NAT and Network Games, p. 1-5, entitled: Just the FAOs, Ma'am, http://www.u.arizona.edu/~trw/games/nat.htm, Oct. 23, 2002.

BroadbandReports.com, How to hookup our console to the net—section all, pp. 1 to 22, http://www.dslreports.com/faq/onlinegaming/all.

Do I use NAT?, pp. 1 to 3, http://www.u.arizona.edu/~trw/games/nat or not.php, Oct. 23, 2002.

Home Toys Article, HAI Omni Solution, UPnP NAT Traversal FAQ, pp. 1 to 4 http://hometoys.com/htinews/aug01/articles/microsoft/upnp_htm, Nov. 11, 2002.

InternetGatewayDevice: I Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society.

Traversal Using Relay NAT (TURN), Rosenberg, Weinberger, Huitema, Mahy, Nov. 14, 2001, pp. 1 to 17.

http://www2.simplex.com/ip.shtml.

http://www.dslreports.com/ip.

Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

(56) References Cited

OTHER PUBLICATIONS

Office Action issued by the USPTO on Apr. 15, 2010 for U.S. Appl. No. 12/235,438.
Arno Wacker et al—"A NAT Traversal Mechanism for Peer-to Peer Networks"—Eighth International Conference on Peer-to Peer Computing (P2P'08), 2008. IEEE. pp. 81-83.
Jim Dowling et al.—"Improving ICE Service Selection in a P2P System using the Gradient Topology"—First International Conference on Self-Adaptive and Self-Organizing Systems (SASO 07), 2007, IEEE, pp. 285-288.
European Search Report dated Jan. 28, 2010 issued for European patent application No. 99252219.2.
Office Action dated Mar. 24, 2010 issued for U.S. Appl. No. 12/235,409.
J. Rosenberg, Interactive Connectivity Establishment (ICE): A Methodology for Network Address Translator (NAT) Traversal for Multimedia Session Establishment Protocols, Jul. 19, 2004, retrieved from http://tools.ietf.org/id/draft-ietf-mmusic-ice-02.txt.
Non-Final Office Action dated Nov. 25, 2008 for U.S. Appl. No. 11/243,853.
Final Office Action dated May 28, 2009 for U.S. Appl. No. 11/243,853.
Non-Final Office Action dated Oct. 13, 2009 for U.S. Appl. No. 11/243,853.
Final Office Action dated Apr. 12, 2010 for U.S. Appl. No. 11/243,853.
J. Rosenberg, "Simple Traversal of UDP Through Network Address Translators (NAT)", BEHAVE Internet-Draft, Jul. 17, 2005.
J. Rosenberg, "Interactive Connectivity Establishment (ICE): A Methodology for Network Address Translator (NAT) Traversal for Offer/Answer Protocols", MMUSIC Internet-Draft, Jul. 17, 2005.
F. Audet, "NAT Behavioral Requirements for Unicast UDP", BEHAVE Internet Draft, Jul. 15, 2005.
J. Rosenberg, "Interactive Connectivity Establishment (ICE): A Methodology for Network Address Translator (NAT) Traversal for Multimedia Session Establishment Protocols", MMUSIC Internet-Draft, Oct. 25, 2004.
J. Rosenberg, Traversal Using Relay NAT (TURN), MIDCOM Internet-Draft, Oct. 20, 2003.
Y. Takuda, "Symmetric NAT Traversal using STUN", Internet Engineering Task Force, Jun. 2003.
J. Rosenberg, "STUN—Simple Traversal of User Datagram Protocols (UDP) Through Network Address Translators (NATs)", Network Working Group, Mar. 2003.
J. Rosenberg, "Interactive Connectivity Establishment (ICE): A Methodology for Network Address Translator (NAT) Traversal for Offer/Answer Protocols", MMUSIC Internet-Draft, Jan. 16, 2007.
International application No. PCT/US2006/038285, "The International Search Report and The Written Opinion of the International Searching Authority".
Sony Computer Entertainment Incorporated, "Cell Broadband Engine Architecture", Version 1.0, Aug. 8, 2005.
International Search Report and Written Opinion of the international Searching Authority dated Oct. 22, 2008—International Patent Application No. PCT/US08/70661,8 Pages.
Office Action dated Feb. 21, 2012 in Japanese Patent Application No. 2010-520064.
Office Action dated Feb. 29, 2012 in Chinese Patent Application No. 200880108512.2.
Office Action dated Nov. 26, 2012 in Chinese Patent Application No. 200880108512.2.
Extended European Search Report for Application No. EP 08782141.9 dated Aug. 21, 2013.

* cited by examiner

NAT TRAVERSAL FOR MOBILE NETWORK DEVICES

CLAIM OF PRIORITY

This application is a continuation of and claims priority to U.S. patent application Ser. No. 11/829,831 filed Jul. 27, 2007, now U.S. Pat. No. 7,933,273, the entire contents of which are incorporated herein by reference.

FIELD OF THE INVENTION

The present invention relates to computer network communication, and more specifically to prioritizing network traffic among distinct channels of communication within a single application.

BACKGROUND OF THE INVENTION

Computing systems are becoming increasing interconnected through network environments. Such network environments may be centralized or decentralized. A decentralized computing environment may be defined by a number of computing systems interconnected to communicate with one another, wherein each computing system can perform both client and server functions. A peer-to-peer (P2P) network represents an example of a decentralized computing environment in which each computing system within the P2P network is defined as a peer of every other computing system within the network. For discussion purposes, each peer computing system within the P2P network is referred to as a node. Additionally, each node within the P2P network may be configured to execute software having substantially equivalent functionality. Therefore, each node may act as both a provider and a user of data and services across the P2P network. Peer to peer networks are distributed data networks without any centralized hierarchy or organization. Peer to peer data networks provide a robust and flexible means of communicating information between large numbers of computers or other information devices, referred to in general as nodes.

A P2P network relies primarily on the computing power and bandwidth of the participants in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology. P2P applications often involve the use of a network address translator (NAT) to facilitate direct communication between peers. The NAT allows a user typically to have multiple networked computers share a single (global or routable) IP address for to access the Internet. The NAT intervenes in direct communication, so in many cases, P2P applications have to deal with the connectivity issues due to the NAT. Techniques used to overcome the connectivity issues are often called "NAT Traversal". The process of Network Address Translation (NAT, also known as Network Masquerading, Native Address Translation or IP Masquerading) generally involves re-writing the source and/or destination addresses of Internet Protocol (IP) packets as they pass through a Router or firewall. Most systems using a NAT do so in order to enable multiple hosts on a private network to access a wide area network, such as the Internet using a single public IP address.

In addition to the convenience and low cost of NAT, the lack of full bidirectional connectivity can be regarded in some situations as a feature rather than a limitation. To the extent that NAT depends on a machine on the local network to initiate any connection to hosts on the other side of the router, it prevents malicious activity initiated by outside hosts from reaching those local hosts. This can enhance the reliability of local systems by stopping worms and enhance privacy by discouraging scans. Many NAT-enabled firewalls use this as the core of the protection they provide. Many network administrators find NAT a convenient technique and use it widely. Nonetheless, NAT can introduce complications in communication between hosts and may have a performance impact.

In a typical configuration, a local network may use one of the designated "private" IP address subnets and a router on that network has a private address in that address space. The router may be connected to the Internet with a single "public" address (known as "overloaded" NAT) or multiple "public" addresses assigned by an Internet Service Provider (ISP). As traffic passes from the local network to the Internet, the source address in each packet is translated on the fly from the private addresses to the public address(es). The router tracks basic data about each active connection (particularly the destination address and port). This internal "tracking" data is sometimes referred to as "NAT binding". When a reply returns to the router, it uses the connection tracking data it stored during the outbound phase to determine where on the internal network to forward the reply; the TCP or UDP client port numbers are used to demultiplex the packets in the case of overloaded NAT, or IP address and port number when multiple public addresses are available, on packet return. To a system on the Internet, the router itself appears to be the source/destination for this traffic. Nodes behind NAT-enabled routers do not have true end-to-end connectivity (i.e., cannot send packets to all other nodes of the network, without requiring intermediate network elements to further interpret them) and cannot participate in some Internet protocols. Services that require the initiation of TCP connections from the outside network, or stateless protocols such as those using UDP, may be disrupted for such nodes unless the NAT router makes a specific effort to support such protocols, incoming packets cannot reach their destination. Some protocols can accommodate one instance of NAT between participating hosts ("passive mode" FTP, for example), sometimes with the assistance of an Application Layer Gateway, but fail when both systems are separated from the Internet by NAT. Use of a NAT may also complicate tunneling protocols such as Ipsec, e.g., if the NAT modifies values in the headers in a way that interferes with the integrity checks done such tunneling protocols.

Any IP enabled application that wants to connect to a network potentially faces problems associated with NAT. Most network applications and devices running dedicated network application software, especially peer-to-peer style applications, may be configured to independently determine the physical network topology they are on in order to best establish direct communications with other applications. This is commonly known as "NAT behavior discovery" or "NAT behavior determination". This operation is well known in the industry, although some varying approaches exist. Existing approaches may often take a significant amount of time to determine NAT behavior. Existing NAT discovery techniques may also be problematic if multiple applications must do NAT discovery.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Figure 1:
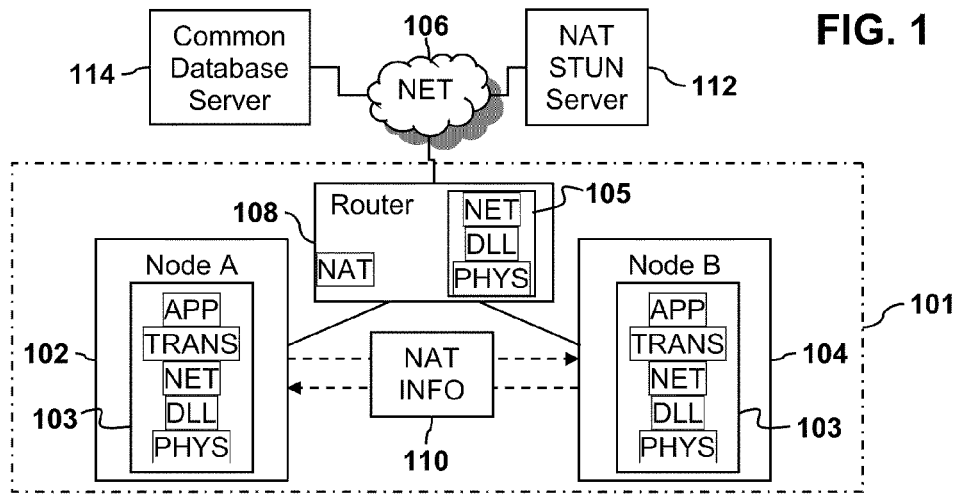
FIG. 1 is a block diagram of a network configured to implement NAT behavior discovery according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

TECHNICAL BACKGROUND

In applications that deal with NAT it is sometimes useful to characterize the NAT by the type of behavior that it exhibits. The STUN protocol may be used to characterize Network address translation as Full cone NAT, restricted cone NAT, port restricted cone NAT or symmetric NAT. With a full cone NAT, also known as one-to-one NAT, all requests from the same internal IP address and port are mapped to the same external IP address and port. An external host can send a packet to the internal host, by sending a packet to the mapped external address. With a restricted cone NAT, all requests from the same internal IP address and port are mapped to the same external IP address and port. Unlike a full cone NAT, an external host can send a packet to the internal host only if the internal host had previously sent a packet to it. A port restricted cone NAT or symmetric NAT is like a restricted cone NAT, but the restriction includes port numbers. Specifically, an external host may send a packet to a particular port on the internal host only if the internal host had previously sent a packet from that port to the external host. With a symmetric NAT all requests from the same internal IP address and port to a specific destination IP address and port are mapped to a unique external source IP address and port. If the same internal host sends a packet with the same source address and port to a different destination, a different mapping is used. Only an external host that receives a packet can send a Universal Datagram Protocol (UDP) packet back to the internal host.

The above-described classifications have become somewhat less useful, because in many NAT implementations the behavior of the NAT may oscillate between the various types. For example, many NAT implementations may follow a port preservation design. For most communications, such a NAT implementation uses the same values as internal and external port numbers. However, if two internal hosts attempt to communicate with the same external host using the same port number, the external port number used by the second host may be chosen at random. Such a NAT may be sometimes perceived as a restricted cone NAT and may be perceived at other times as a symmetric NAT.

NAT discovery and NAT behavior determination are sometimes referred to as NAT traversal. Examples of NAT traversal are described e.g., in U.S. Published Patent Application 20070076729, which is incorporated herein by reference. NAT behavior discovery may be a time-consuming operation. For example, NAT discovery may be implemented using a protocol referred to as STUN. Details of the STUN protocol are described, e.g., in IETF RFC 3489, which is incorporated herein by reference. In the STUN protocol, multiple messages are sent are sent to a central NAT discovery server (referred to as a STUN server) and received to establish NAT behavior type. Some message transactions may have to wait for timeout (typically about 10 seconds for each transaction) due to filtering behavior of NAT. Messages are also possibly resent in the presence of unreliable communication channels. Applications that can avoid all or some of this operation may start faster.

Cooperative NAT Behavior Discovery

In embodiments of the present invention nodes on a local network may share information about discovered NAT behavior and other aspects of the local physical network topology. Additionally, these nodes may actively cooperate to further determine NAT behavior rather than passively sharing NAT behavior discovered independently. This is important since NAT discovery can be time-consuming, as discussed above. Furthermore, there are non-trivial issues that occur when trying to use NAT devices that have varying behavior when used by more than one application. This may occur, for example, when static port mapping is configured for a particular local port.

According to embodiments of the present invention, multiple nodes may be behind the same NAT. One of the nodes may discover the properties of the NAT through conventional NAT discovery and/or NAT traversal. This node may share the NAT traversal information with the others that are behind the same NAT. This may allow the other nodes behind the NAT to avoid having to spend time performing NAT discovery. The NAT information may be stored in a central location that all the nodes behind the NAT may access before they would normally attempt NAT discovery.

By way of example, FIG. 1 depicts a network topology illustrating cooperative NAT behavior discovery according to an embodiment of the present invention. Generally, a local area network (LAN) 101 may include two or more nodes, e.g., Node A 102 and Node B 104, may be connected to a router 108. The router 108 connects to a wide area network (WAN) 106 such as the Internet. The router 108 may have a network address translator (NAT) associated with it. There are many possible configurations for the nodes 102, 104 that are within the scope of embodiments of the invention. In general, a node may be configured to implement communication over a network using internet protocol (IP). Node A 102 and Node B 104 may be IP-enabled devices or IP-enabled applications running on different devices or the same device. As used herein, the term IP-enabled, means that a devices makes use of IP to communicate with other hosts or devices. By way of example, and with out limitation, an IP-enabled device or application may include an internet protocol stack or similar network protocol stack to make use of IP to communicate with other hosts or devices. Although two nodes are shown in FIG. 1 for the sake of example, those of skill in the art will recognize that embodiments of the invention may also be implemented with more than two nodes.

It is noted that embodiments of the invention may incorporate any number of nodes. By way of example, Node A 102 and Node B 104 may be any network capable device or network capable applications running on such devices. Such nodes include, but are not limited to, computers, hand held internet browsers and/or email devices, Voice over Internet Protocol (VoIP) phones, video game consoles, hand held video game devices, and the like. Messages may travel from one node to another over via the router 108. The NAT may be implemented on the router 108 in hardware, software, firmware or some combination of two or more of these.

Node A 102, Node B 104 and the router 108 may be configured to communicate with each other according to a network protocol. By way of example, Node A 102, and Node B 104 may be configured (either in software or hardware or some combination of both) with a network protocol stack 103 having five layers: an Application layer APP, a Transport layer TRANS, a Network layer NET (sometimes referred to as the IP layer), a Data Link Layer DLL and a Physical layer PHYS. These layers are well-known to those of skill in the art. The nodes 102, 104 typically implement all five layers. The router 108 may include a protocol stack 105 that implements only the Network layer NET, Data Link layer DLL and Physical layer PHYS. In some embodiments, one or more routers may include all five protocol stack layers. One example of such routers is firewalls that support "application layer gateway" which inspects application layer data. The illustrated configuration of the protocol stack 105 in the router 108 is relatively more common, however.

The Application layer APP represents the level at which applications access network services. This layer represents the services that directly support applications such as software for file transfers, database access, and electronic mail. Examples of application layer software include HL7, Modbus, Session Initiation Protocol (SIP), and Simple Sensor Interface Protocol (SSI). In the particular case of the TCP/IP suite, the Application layer APP may be implemented with software protocols such as Hypertext Transfer Protocol (HTTP), Session Initiation Protocol (SIP), Simple Mail Transfer Protocol (SMTP), Short Message Peer-to-Peer Protocol (SMPP), Simple Network Management Protocol (SNMP), File Transfer Protocol (FTP), Teletype Network (TELNET), Network File System (NFS), Network Time Protocol (NTP), Real-time Transport Protocol (RTP), Dynamic Host Configuration Protocol (DHCP), and Domain Name System (DNS). The Application layer APP may sometimes be divided further into a Presentation layer and a Session layer, e.g., in the Open Systems Interface (OSI) protocol. The Presentation layer translates data from the Application layer into an intermediary format. The Presentation layer may also manages security issues by providing services such as data encryption, and compresses data so that fewer bits need to be transferred on the network. The Session layer allows two applications on different computers to establish, use, and end a session. The Session layer may establish dialog control between the two computers in a session, regulating which side transmits, plus when and how long it transmits.

The transport layer TRANS services requests from the Application layer APP and issues service requests to the Network layer NET. In some protocols the Transport layer TRANS may also handle error recognition and recovery. For a transmitting host, the Transport layer may also repackage long messages when necessary into small packets for transmission. For a receiving host the Transport layer rebuilds packets into the original message. The Transport layer for a receiving host may also send receipt acknowledgments. Examples of particular Transport layer protocols include Transmission Control Protocol (TCP), User Datagram Protocol (UDP) and Stream Control Transmission Protocol (SCTP), all of which, and equivalents thereof, are well-known to those of skill in the art. The Transport layer TRANS is the layer that typically supports packet fragmentation. It is noted that fragmentation may take place in the Transport layer of the host originating a message or at the Transport layer of any of the routers along the path between that host and the message's intended recipient. Not all transport layer implementations necessarily handle error recognition and recovery. TCP, for example, does handle error recognition and recovery, but UDP does not.

The Network layer NET addresses messages and translates logical addresses and names into physical addresses. It also determines the route from the source to the destination computer. The Network layer may also manages traffic problems, such as switching, routing, and controlling the congestion of data packets. Examples of particular Network layer protocols include, but are not limited to, Internet Protocol (IP), Internet Control Message Protocol (ICMP), IP Security (Ipsec), Address Resolution Protocol (ARP), Routing Information Protocol (RIP) and Open Shortest Path First (OSPF) all of which, and equivalents thereof, are well-known to those of skill in the art The Data Link layer DLL packages raw bits from the Physical layer PHYS into frames (logical, structured packets for data). The Data Link layer may also be responsible for transferring frames from one computer to another, without errors. After sending a frame, the Data Link layer DLL waits for an acknowledgment from the receiving computer. Examples of particular Data Link layer protocols include, but are not limited to, Point-to-Point Protocol (PPP), Serial Line Internet Protocol (SLIP) and Media Access Control (MAC) all of which, and equivalents thereof, are well-known to those of skill in the art. The Data Link layer DLL typically limits the MTU size.

The Physical layer PHYS transmits bits from one computer to another and regulates the transmission of a stream of bits over a physical medium. This layer defines how the cable is attached to the network adapter and what transmission technique is used to send data over the cable. Examples of particular Physical layer protocols and standards include, but are not limited to, RS-232, V.35, V.34, I.430, I.431, T1, E1, 10BASE-T, 100BASE-TX, POTS, SONET, DSL, 802.11a, 802.11b, 802.11g, 802.11n all of which, and equivalents thereof, are well-known to those of skill in the art A message originating at Node A 102 starts at the Application layer APP and works its way down the protocol stack to the Physical layer PHYS. When the message arrives at Node B 104, it is received at the Physical layer PHYS and works its way up the stack to the Application layer APP. In the path between the two nodes 102, 104, the message may be received at the Physical layer PHYS of router 108 and work its way up to the Transport layer TRANS and then back down the stack to the Physical layer PHYS for transmission to router 108. The process may be repeated for any additional routers (not shown) along the path between Node A 102 and Node B 104. In peer-to-peer situations, once a connection has been established between the Node A 102 and Node B 104 they may communicate directly by peer-to-peer connections, e.g., at the Application layer APP or at the Transport layer TRANS.

As discussed above, the router 108 may include a network address translator. However, this is not necessary for all embodiments of the invention. If the router 108 includes a NAT, Node A 102 and Node B 104 may have to traverse the NAT in order to establish peer-to-peer connections with each other, with other node connected in the LAN 101 or with other nodes connected to the WAN 106. To facilitate NAT traversal, Node A 102 and Node B 104 may obtain and share information 110 regarding the NAT. There are a number of ways in which the information 110 may be obtained and shared. By way of example, and without loss of generality, Node A 102 and Node B 104 may obtain the information 110 through individual attempts at NAT traversal. Such attempts at NAT traversal may involve the use of a STUN server 112. Alternatively, Node A 102 and Node B 104 may obtain the information 110 from other Nodes connected to the LAN 101.

The information 110 may be shared in any of a number of different ways. For example, Node A 102 and Node B 104 may store the information locally, e.g., in a cache or other memory location. Where Node A 102 and Node 104 are separate devices or applications on separate devices, storing information locally may include, among other things, storing the information in particular memory locations at each corresponding device. If Node A and Node B are different applications on the same device, storing the information locally may include, among other things, storing the information in particular memory locations associated with the device. If the information 110 is stored locally, Node A and Node B may query each other directly prior to their respective attempts at NAT traversal to obtain the information 110. In alternative embodiments, the information 110 may be stored in a memory location that is commonly accessible to both Node A 102 and Node B 104. Such a commonly accessible memory location may be on another node or device connected to the LAN 101 or the WAN 106. By way of example, the commonly accessible memory location may be a common database server 114 connected to the WAN 106. In some embodiments, the information 110 may be obtained by and stored at the router 108. This may require special implementation at the router 108.

By way of example, the information 110 may include a unique address for the router, e.g., a globally unique address such as a Media Access Control (MAC) address or internal IP address. As used herein, a MAC address, also known as a hardware address or adapter address is a quasi-unique identifier attached to most network adapters. A MAC address is typically a number that acts like a name for a particular network adapter. Thus, for example, network cards (or built-in network adapters) in two different computers could have different names, or MAC addresses, as could an Ethernet adapter and a wireless adapter in the same computer, and as could multiple network cards in a router. The MAC address may be assigned according to a suitable protocol such as MAC-48, EUI-48, and EUI-64, which are designed to be globally unique.

In addition, the information 110 may include information regarding the type of NAT behavior, if any, exhibited by the router 108, and/or whether any ports on the router are being used by devices connected to the LAN 101.

Examples of other NAT behavior information that may be shared includes, but is not limited to (i) the number of active sessions via the NAT; or (ii) the collective traffic load on the NAT. Furthermore the information 110 may include a value of a flag realizing atomicity of port prediction against symmetric NAT. The flag may indicate whether a particular atomic for port prediction is locked or unlocked. An atomic lock is sometimes used for port prediction in symmetric NAT traversal. The locking is useful since port prediction may fail if other nodes under the same NAT create another NAT binding during the prediction phase.

Figure 2A:
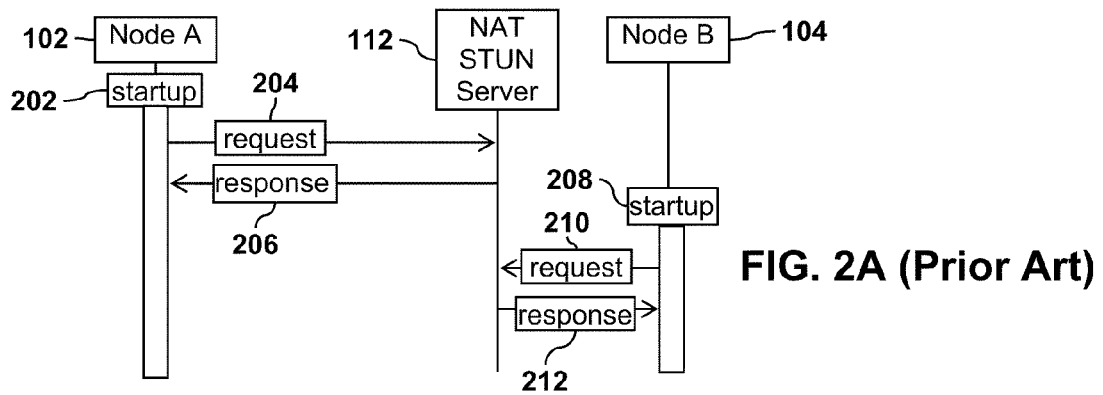
FIG. 2A is a flow diagram illustrating a prior art method of determining NAT behavior.

According to embodiments of the invention Node A 102 and Node B 104 may implement NAT discovery by any conventional technique, which may be implemented in hardware, software, firmware or some combination of two or more of these. By way of example, FIG. 2A depicts one type of NAT discovery. As shown in FIG. 2A, Node A 102 may, at a startup 202, send a request 204 for NAT information to the STUN server 112, which may send back a response 206. The response 206 may include information regarding the type of NAT that Node A 102 is behind. At a later time, Node B 104, at a startup 208, may similarly send a request 210 and receive response 212. It is noted that the responses 206, 212 may each include the same or similar information regarding the NAT behavior, particularly if both Node A 102 and Node B 104 are behind the same NAT. However, depending on the nature of the NAT in the router 108, the NAT behavior may change over time. Embodiments of the invention allow sharing of NAT behavior information which can facilitate NAT traversal.

Figure 2B:
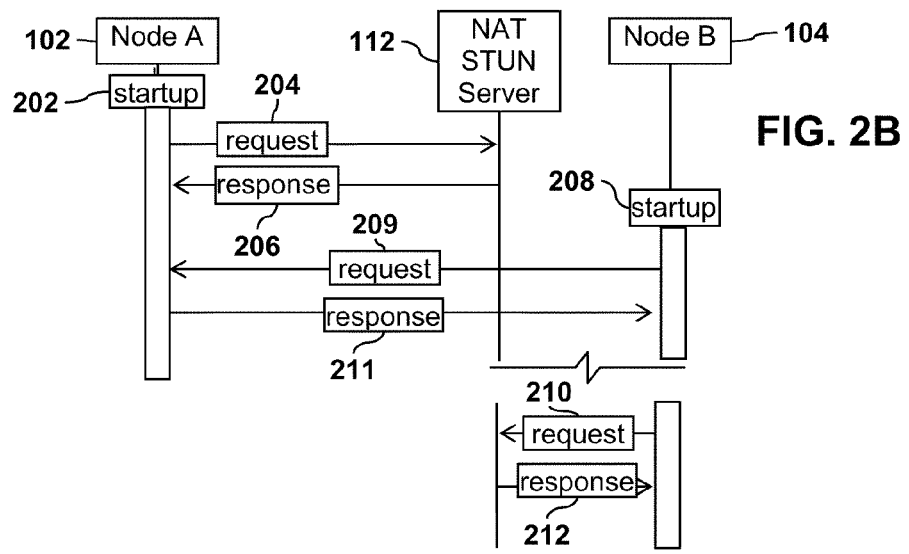
FIGS. 2B-2D are flow diagrams illustrating methods of determining NAT behavior according to embodiments of the present invention.

By way of example, as shown in FIG. 2B, Node A 102 and Node B 104 may share NAT information 110 as follows. As in FIG. 2A, Node A 102 may, at a startup 202, send a request 204 for NAT information to the STUN server 112, which may send back a response 206. The response 206 may include information 110 regarding the type of NAT that Node A 102 is behind. The information 110 may be stored locally at Node A 102. At a later time, Node B 104, at a startup 208, may send a request 209 to one or more other nodes behind the router 108. For example, as shown in FIG. 2B, Node B 104 may send the request 209 to Node A 102. It is noted that the request 209 may be broadcast to all other nodes behind the router 108 since Node B 104 may not know which of them may have information regarding the NAT behavior of the router. Any of the nodes that receive the request 209 may respond with NAT behavior information. In this example, Node A 102 had previously obtained information 110. Therefore, Node A 102 may send a response 211 to Node B 104 containing the information 110 or some useful subset of that information. If none of the other nodes responds to the request 209, Node B 104 may fall back to conventional NAT discovery, e.g., by sending a request 210 to the STUN server 212 and receiving a response 212. Information obtained from the response may be stored locally and made available to other nodes upon request.

Figure 2C:
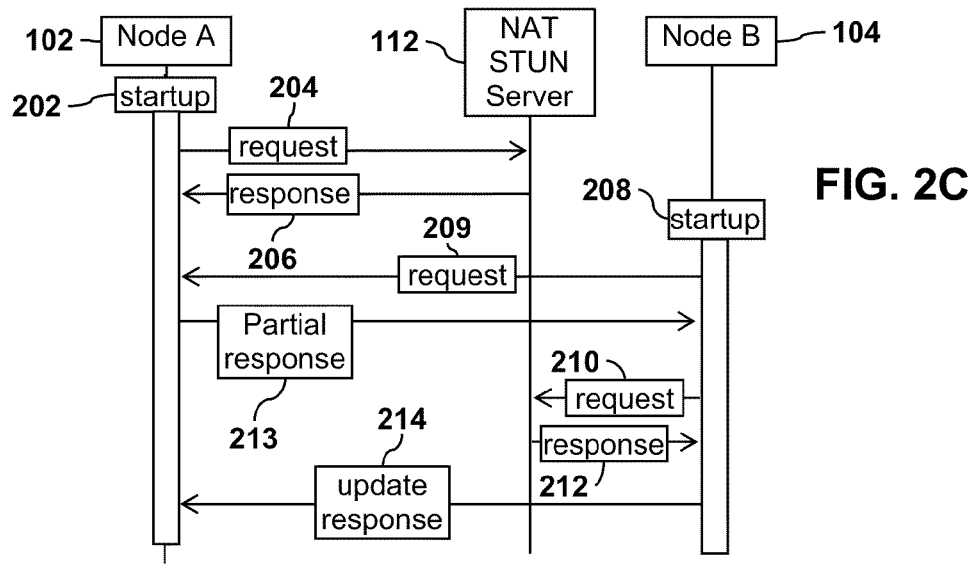

It is further noted that two or more nodes may cooperate to determine behavior of the router 108. For example, as shown in FIG. 2C Node A 102 may, at a startup 202, send the STUN server 112 a request 204 for NAT information. The STUN server 112 may send back a response 206 containing NAT behavior information 110, which may then be stored locally at Node A 102. The NAT behavior information 110 may be incomplete, e.g., it may narrow the NAT behavior to being of more than one possible type. At a later time, Node B 104, at a startup 208, may send a request 209 to one or more other nodes behind the router 108 including Node A 102. In reply to the request 209 Node A 102 may send a partial response 213. The partial response 213 may include the information Node A 102 was able to obtain. The partial response 213 may also indicate what additional information is needed to characterized the NAT behavior of the router 108. Node B 104 may then send a request 210 to the STUN server 112 and receive a response 212 in return. The response 212 may provide the missing information needed to characterize the NAT behavior of the router 108. Node B 104 may then share this information, e.g., by sending an update response 214 to Node A 102 and/or any other nodes behind the router 108.

Note that in the example depicted in FIG. 2C, the process of partial response and update response pairs may continue until details of NAT behavior are fully determined. This may be particularly useful in cases where the router 108 allocates external bindings for multiple requests with non-deterministic behavior.

The effect of sharing the information 110 on improving NAT behavior determination is not insignificant. Typically, requests to and responses from the STUN server 112 may be subject to latencies associated with both the LAN 101 and the WAN 106. Requests from one node to another on the LAN 101 are typically subject only to latencies associated with the LAN 101. WAN latencies are generally much larger than LAN latencies. For example, with a theoretical WAN latencies of about 100 milliseconds and LAN latencies of less than about 1 millisecond, sharing NAT behavior information 110 among the nodes on the LAN 101 could improve the NAT behavior determination phase by a factor of over 100.

In addition the nodes on the LAN 101 may cooperatively share NAT information after each node has independently determined NAT behavior type on its own. In this case, gossip between nodes about determined behavior could identify a router that has bad local port preservation behavior, which could effectively turn the router 108 from port-restricted to symmetric behavior. Sharing of the information 110 may be used to diagnose changes to the behavior of the router 108. Sharing of the information 110 may also be used to a priori workaround NAT issues associated with bad local port preservation. For instance, multiple nodes behind the router 108 could broadcast to each other which local ports on the router 108 they want to use. A given node (e.g., Node A 102) could change the selected port if another node (e.g., Node B 104) is already using the selected port. Additionally, nodes may gossip about other unanticipated behavior changes of the local network environment of the LAN 101. For example, a residential NAT typically has one global IP address that is dynamically assigned by ISP (Internet Service Provider such as Comcast) using a protocol called DHCP. The assigned dynamic IP for NAT may expire and the ISP could assign another IP address. If that happens, it may take some time for a local node to detect such event. If one node detects the event, it may notify other nodes, using broadcast, of the event.

In the embodiments depicted in FIGS. 2B-2C the NAT-related information 110 was stored locally at each node behind the router 108. In other embodiments, the information 110 may be stored at some common location that is accessible to all the nodes behind the router 108. As discussed above, such a common location may be a common database server 114 or similar node connected to the WAN 106. The common database server 114 may be accessed using a suitable protocol, such as hypertext transfer protocol (HTTP).

Figure 2D:
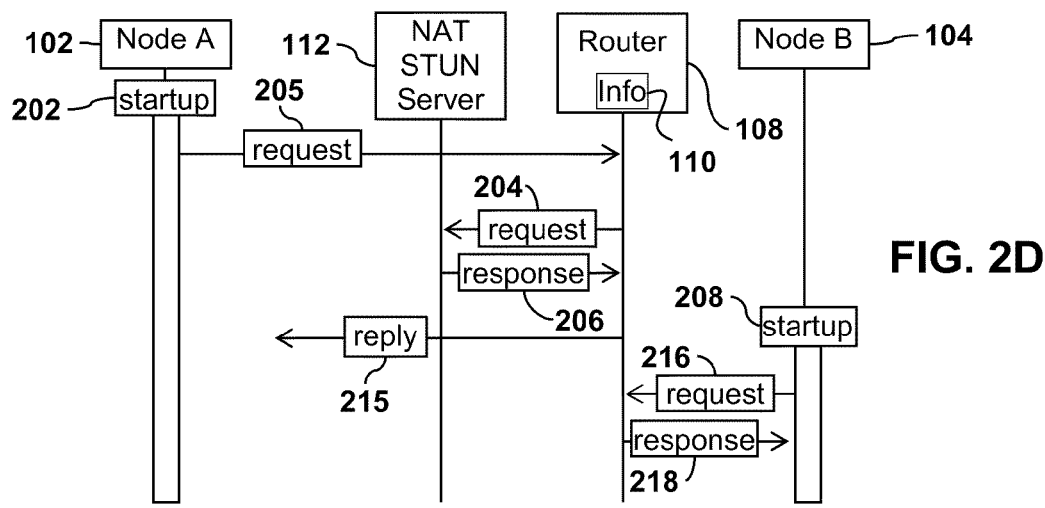

Alternatively, the common location may be a node that is part of the LAN 101. For example, as shown in FIG. 2D, the information 110 may be stored at the router 108. In this example, a node, e.g., Node A 102 may send a NAT information request 205 to the router 108, e.g., at startup 202. The router 108 may be configured, e.g., through appropriate programming, to send a request 204 to the STUN server 112 and receive a response 206 in return. The router 108 may then forward a reply 215 based on the response 206 to Node A 102. The router 108 may optionally determine the NAT behavior information 110 from the response 206 and store the information, e.g., in a memory locally accessible by the router 108.

The reply 215 may include NAT behavior information 110 obtained from the response 206. Alternatively, the reply 215 may involve forwarding the response 206 to Node A 102. When a different node subsequently requests NAT behavior information, the router 108 may respond directly using the stored information 110. For example, at startup 208, Node B 104 may send a NAT behavior information request 216 to the router 108. In response, the router 108 may send a reply 218 based on the stored NAT behavior information 110.

In the example depicted in FIG. 2D, it has been assumed that the address of the router 108 is well-known to all nodes behind it. In such a case, the requests 205, 216 and replies 215, 218 do not need to be broadcast. Furthermore, in the example depicted in FIG. 2D, only one round trip message is sent between each node and the router 108. In conventional situations, by contrast, each node talks to the NAT STUN Server, which often requires multiple round-trip messages. In addition, the router 108 may optionally perform behavior determination with the NAT STUN Server 112 in a lazy fashion, i.e., only when a request is made to it from a client. If the NAT behavior of the router is deterministic, this may also occur at initialization of the router 108. In the case of completely deterministic behavior of a NAT device, communication with the NAT STUN Server 112, may be omitted since the router behavior is well-known and may be communicated directly to the nodes behind the router 108.

The approach described above may appear more than superficially similar to Universal Plug and Play (UPnP) Gateway protocols. Embodiments of the present invention are different from UPnP in a number of ways. Most significantly, when a UPnP device is added to a LAN the UPnP device advertises its services to control points on the LAN. In embodiments of the present invention, by contrast, nodes on the LAN find out information about the control points (NATs on Routers) and make that information available to other devices.

Furthermore, the lack of true standardization of NAT behavior makes the existing UPnP mechanism less-than completely viable. In particular, UPnP is mainly supported only by residential routers, but not by other larger scale routers. For example, the routers in a hotel that provides Internet access services from rooms typically do not support UPnP. Another case in which UPnP does not work is that some ISP may provide private addresses for routers that provide certain services, e.g., HOT SPOT service. In such cases, the external address a node obtains is a private address of the nearest UPnP NAT. The node still needs to use a STUN server to obtain an actual global address that is routable over the Internet. In addition, there many existing routers do not support UPnP, or UPnP may not be turned on for many routers that do support UPnP.

In alternative embodiments of the invention, a single application running on a device on the local network 101 could perform many, but not all of these operations on behalf of other applications. The device running this application is referred to herein as a NAT proxy. If a NAT proxy is only running on one device, it may not be able to determine certain NAT issues associated with bindings to different internal IP addresses. This may be overcome by running at least two instances of this application on two devices, although much of the ease of use may be lost by doing this.

Figure 3A:
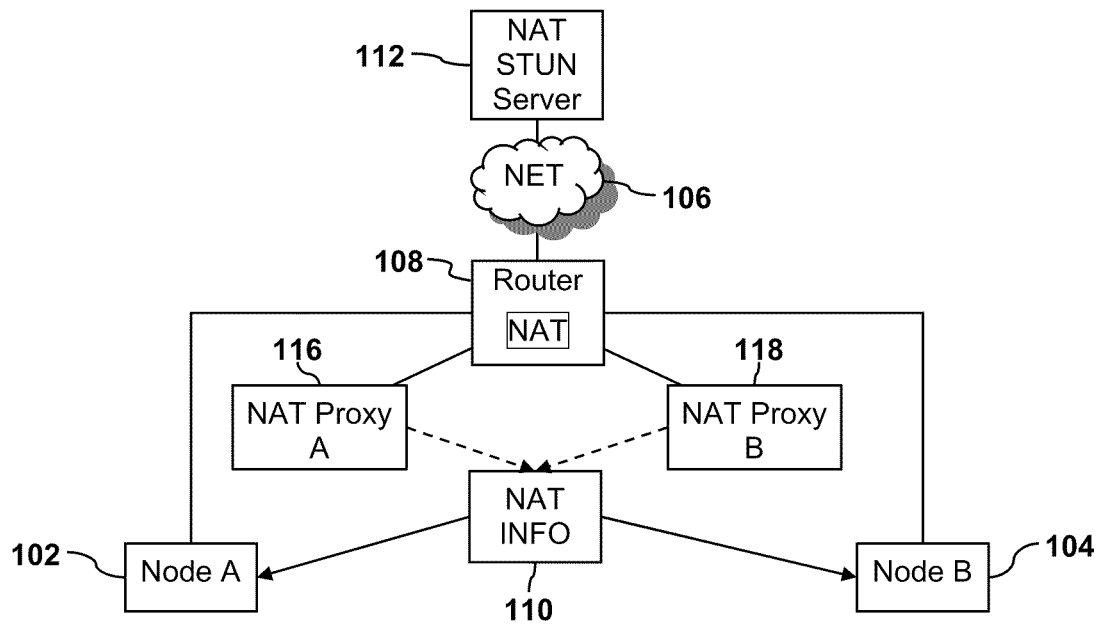
FIG. 3A is a block diagram of a network configured to implement NAT behavior discovery using NAT proxies according to an alternative embodiment of the present invention.
Figure 3B:
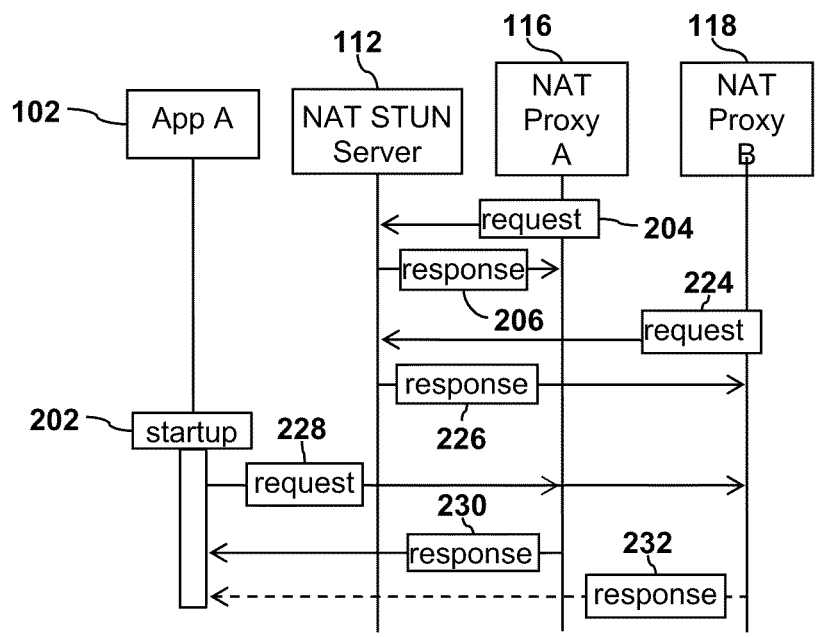
FIG. 3B is a flow diagram illustrating a method of NAT behavior discovery using NAT proxies according to an alternative embodiment of the present invention.

Embodiments that utilize NAT proxies may be understood with respect to FIG. 3A and FIG. 3B. As shown in FIG. 3A the local network 101 may include a first NAT proxy 116 associated with Node A 102 and a second NAT proxy 118 associated with Node B 104. The NAT proxies 116, 118 may be coupled to the router 108. The NAT proxies may query the stun server 112 from time to time in order to obtain NAT behavior information 110 and share it with Node A 102, Node B 104 and any other nodes behind the router 108. By way of example, as shown in FIG. 3B, the first NAT proxy 116 may send a request 204 to the STUN server 112 and receive a response 206 in reply. Similarly, the second NAT proxy 118 may send a request 224 to the STUN server 112 and receive a response 226 in reply. The NAT proxies 116, 118 may derive the NAT behavior information 110 in whole or in part from the responses 206, 226. After the information 110 has been derived, one of the nodes connected to the router 108 may query the NAT proxies 116, 118 for the NAT behavior information 110. For example, Node A 102 may broadcast a request 228 to the NAT proxies 116, 118, which may respectively send responses 230, 232 in reply.

A NAT proxy application may be co-located on the same physical device node as the requesting application. A node only needs to receive one response from any NAT proxy. It is possible that the NAT proxies could run in a hierarchical fashion where only one proxy has the responsibility for sending responses in the local network. This has the unfortunate side-effect of creating a single point of failure within an otherwise redundant network configuration. In addition, The NAT proxy technique described with respect to FIG. 3A and FIG. 3B may be combined with the partial response/update response technique described above with respect to FIG. 2C to arrive at a cooperative global understanding of NAT behavior type between proxy nodes.

Figure 4:
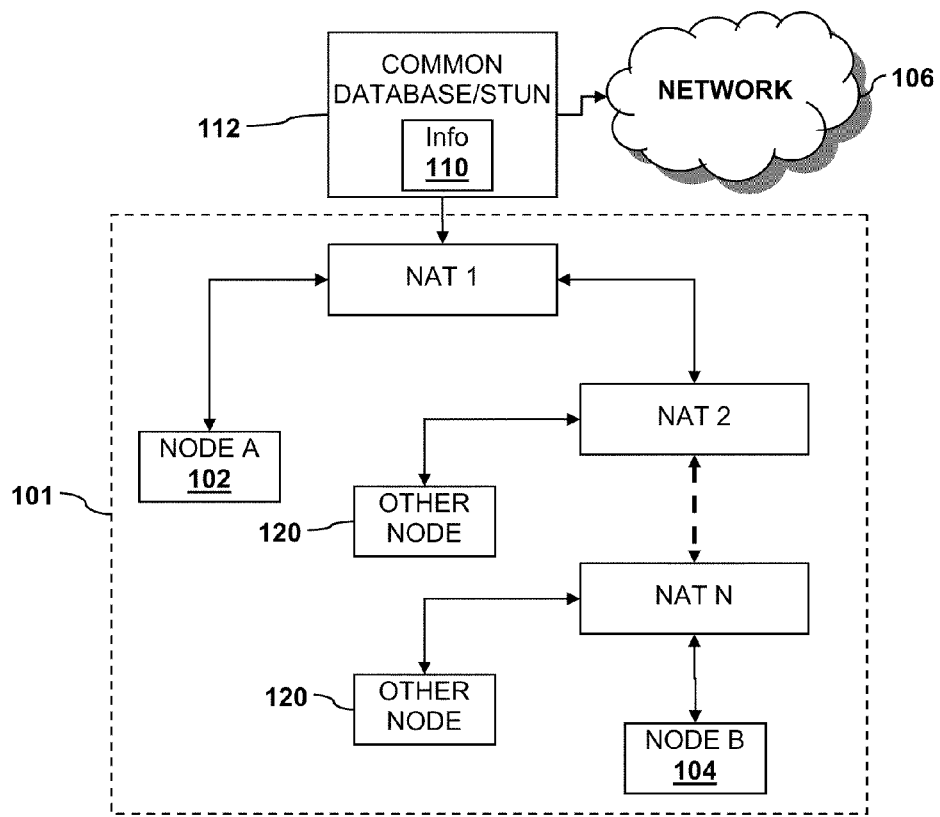
FIG. 4 is a block diagram illustrating NAT behavior discovery according to an embodiment of the present invention involving a node behind multiple NATs.

In the foregoing discussion, it has been assumed that each node is behind a single NAT. It is possible, in some network configurations for a node to be located behind more than one NAT. Embodiments of the present invention may be modified to address situations where a given Node lies behind more than one NAT. For example, as shown in FIG. 4 both Node A 102 and Node B 104 are behind NAT 1. However, Node B 102 is also behind NAT 2 though NAT N. In this example, NAT 1 may be part of a gateway router between the local area network 101 and the wide area network 106. Information about the presence and behavior of NAT 1 may be useful to both Node A 102 and Node B 104 for communication with the WAN 106. In addition, information about NAT 1 and NAT 2 through NAT N will be useful for situations where Node A 102 and Node B 104 communicate with each other.

By way of example, the nodes 102, 104, 120 may determine how many NATs they are behind though the use of a field within the header of a datagram having a value that is reduced at each NAT device encountered en route to the datagram's destination. By way of example, field may be a time to live (TTL) field. Within the context of Ipv4 TTL refers to an 8-bit field in the Internet Protocol (IP) header. It is the 9th octet of 20. The time to live value may be thought of as an upper bound on the time that an IP datagram can exist in an internet system. The TTL field may be set by the sender of the datagram, and reduced by every host on the route to its destination. If the TTL field reaches zero before the datagram arrives at its destination, then the datagram is discarded and an Internet Control Message Protocol (ICMP) error datagram (11—Time Exceeded) is sent back to the sender. The TTL field is conventionally used to avoid a situation in which an undeliverable datagram keeps circulating on an internet system, and such a system eventually becoming overwhelmed by large numbers of such "immortal" datagrams. In theory, time to live may be measured in seconds, although every host that passes the datagram must reduce the TTL by at least one unit. In practice, the TTL field is reduced by one on every hop. To reflect this practice, the field is named hop limit in IPv6. The ICMP error datagram identifies the last host the datagram arrived at before timing out. A tool called traceroute uses ICMP error messages to detect a path to a remote end node. TTL or hop limit fields may be used to determine the addresses of the NATs between Node A 102 and Node B 104 in a manner similar to that used in a traceroute command.

In embodiments of the invention, Node A 102 and Node B 104 and other nodes 120 may share information 110 relating to the behavior of NAT 1 and NAT 2 through NAT N. The nodes 102, 104, 120 may obtain the NAT information 110, e.g., as discussed above with respect to FIGS. 2A-2D and store the information in a manner accessible by all of the nodes on the LAN 101. By way of example, the information 110 may be cached on a server 112 such as a common database server or STUN server. By way of example, the server 112 may reside between the LAN 101 between the WAN 106. It is further noted that devices hosting NAT 1 and NAT 2 through NAT N may also gather information about themselves and share it with the nodes 102, 104, 120.

Figure 5:
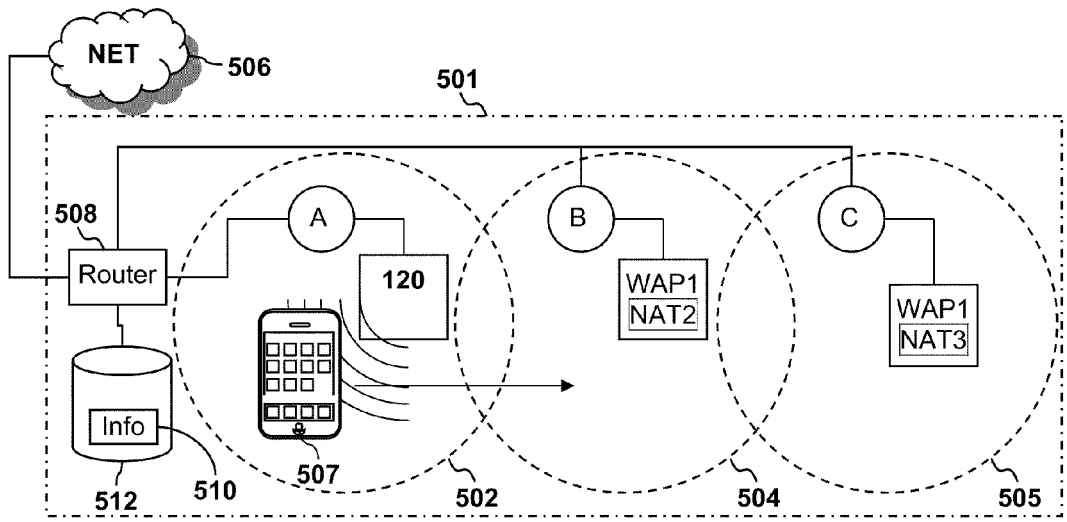
FIG. 5 is a block diagram illustrating a NAT behavior discovery according to an embodiment of the present invention involving a wireless node.

Embodiments of the invention may be used to implement NAT behavior discovery with wireless nodes. For example, as shown in FIG. 5, a wireless network 501 may include first, second and third, wireless access points WAP1, WAP2, and WAP3, which may be at geographically distributed locations. The wireless access points WAP1, WAP2, and WAP3 may be implemented, e.g., by wireless routers, which may include network address translators NAT1, NAT2 and NAT3 respectively. The wireless access points WAP1, WAP2, and WAP3 may be characterized by corresponding coverage areas 502, 504, 505. A wireless node 507 may access the network 501 if it is within one of the coverage areas. By way of example, the wireless node 507 may be any device configured for wireless network communication. Examples of such devices include, but are not limited to laptop computers, portable video game devices, portable music download devices, portable Voice over Internet protocol (VoIP) devices, and portable Internet browser or email devices, such as the Blackberry®. Blackberry® is a registered trademark of Research in Motion LTD of Waterloo, Ontario Canada. In addition, such devices include wireless devices that incorporate two or more functions, such as VoIP, internet, email and music downloads. An example of such a device is the iPhone from Apple Inc. of Cupertino, Calif.

The wireless access points WAP1, WAP2, WAP3 may be connected to a wide area network 506 via a router 508. In addition there may be other nodes A, B, C connected between the router 508 and the wireless access points WAP1, WAP2 and WAP3 respectively. Information 510 regarding the network address translators NAT1, NAT2, NAT3 may be stored at a centrally accessible cache 512 that is coupled to the router 508. There are a number of different ways of obtaining and caching the information 510. For example, the wireless node 507 may gather part of the information 510 through conventional NAT traversal and share it with other nodes as shown in FIG. 2B or FIG. 2C. In addition, the router 508 or wireless access points WAP1, WAP2, WAP3 may obtain the information 510 as described above with respect to FIG. 2D. Furthermore, the other nodes A, B, C may obtain all or part of the information by acting as proxy nodes as described above with respect to FIG. 3A and FIG. 3B. Furthermore, although the information is shown as being stored in a single location 512, the information 510 may alternatively be distributed among the nodes connected to the network 501. In some embodiments, information relating to the wireless network address translators NAT1, NAT2, NAT3 may be stored locally at the corresponding wireless access points WAP1, WAP2, WAP3. It is noted that the information 510 may include a geographic location for each NAT or wireless access point. The information 510 may also include other general information related to the NAT or wireless access point. Such information may include, but is not limited to information relating to local restaurants, weather, identity of other devices connected to the network 501 number of times a particular wireless access point has been visited and other general information. A wireless device may access this information when accessing the network 510 through any of the wireless access points WAP1, WAP2, WAP3.

Through sharing of the information 510 the quality of service over the wireless network 501 may be enhanced. For example, the wireless node 507 may move from one coverage area to another, e.g., from the coverage area 502 for the first wireless access point WAP1 to the coverage area 504 for the second wireless access point WAP2. The information 510 may be organized such that the wireless device 507 can request NAT information for a neighboring wireless access point, such as the second wireless access point WAP2. In some embodiments, the device 507 may be programmed to determine, e.g., from GPS data or wireless signal strength a general direction of travel of the wireless device and use this direction to estimate which wireless access points the device is likely to encounter.

Embodiments of the present invention may also apply to situations in which a NAT moves. For example, the wireless access points WAP1, WAP2, WAP3 may be mounted on vehicles. The wireless node 507 may determine whether a NAT is mobile e.g., from geographical information. For example, the wireless node 507 may include a geographical location system, such as a global positioning satellite system (GPSS) receiver. Using such a system, the node 507 may its own location when it encounters the NAT. If the node 507 encounters the same NAT when the node is in two different locations that are sufficiently far apart the node may infer that the NAT has moved.

Figure 6:
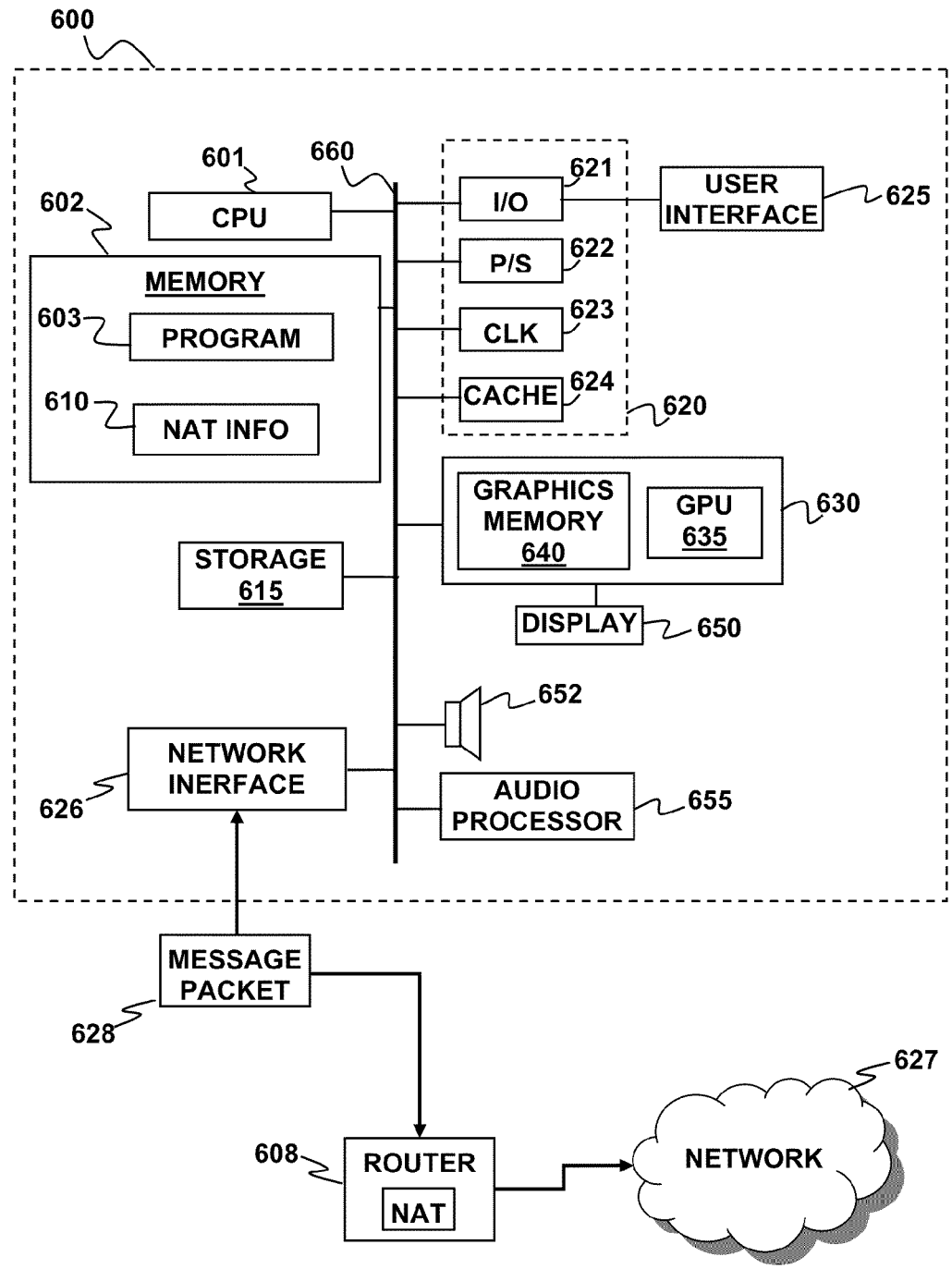
FIG. 6 is a block diagram of a node configured to implement NAT behavior discovery according to an embodiment of the present invention.

As mentioned above, there are a number of different configurations for a node that may be used in conjunction with embodiments of the present invention. By way of example, and without loss of generality, FIG. 6 is a block diagram illustrating the components of a node 600 suitable for implementing NAT behavior discovery according to an embodiment of the present invention. By way of example, and without loss of generality, the node 600 may be implemented as a computer system, such as a personal computer, video game console, personal digital assistant, wireless device, or other digital device, suitable for practicing an embodiment of the invention. In some embodiments, the node 600 may be a router. The node 600 may include a central processing unit (CPU) 601 configured to run software applications and optionally an operating system. The CPU 601 may include one or more processing cores. By way of example and without limitation, the CPU 601 may be a parallel processor module, such as a Cell Processor. An example of a Cell Processor architecture is described in detail, e.g., in Cell Broadband Engine Architecture, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In the node 600 a memory 602 may be coupled to the CPU 601. The memory 602 may store applications and data for use by the CPU 601. The memory 602 may be in the form of an integrated circuit, e.g., RAM, DRAM, ROM, and the like). A computer program 603 may be stored in the memory 602 in the form of instructions that can be executed on the processor 601. The instructions of the program 603 may be configured to implement, amongst other things, NAT behavior discovery, e.g., as described above. In particular, the program 603 may be instructions that, when executed, cause the node 600 to determine information regarding the behavior of one or more NATs and store the information in such a way that the information is retrievable by node 600 or one or more other nodes. Furthermore, the program 603 may be configured to retrieve information regarding behavior of one or more NATs obtained by one or more other nodes and use the information to traverse one or more of the NATs.

The memory 602 may contain data that is generated by or usable by the program 603. In particular the memory 602 may contain information 610 relating to one or more NATs. Specifically, the information 610 may include, but is not limited to (i) NAT behavior information (e.g., whether the NAT is full cone, restricted cone, port restricted, symmetric) including whether the NAT behavior includes port preservation or not; (ii) available STUN server addresses; and (iii) common database addresses. The information 610 may be stored in a section of the memory 602 that can be accessed by other nodes.

The node 600 may further include a storage device 615 that provides non-volatile storage for applications and data. By way of example, the storage device 615 may be a fixed disk drive, removable disk drive, flash memory device, tape drive, CD-ROM, DVD-ROM, Blu-ray, HD-DVD, UMD, or other optical storage devices. The node 600 may also include well-known support functions 620 commonly used in computing systems. Such support functions may include such features as input/output (I/O) elements 621, power supplies (P/S) 622, a clock (CLK) 623 and cache 624.

One or more user input devices 625 may be used to communicate user inputs from one or more users to the node 600. By way of example, one or more of the user input devices 625 may be coupled to the node 600 via the I/O elements 621. Examples of suitable input devices 625 include keyboards, mice, joysticks, touch pads, touch screens, light pens, still or video cameras, and/or microphones. In the particular case of A/V chat, it is desirable for the user input devices 625 to include both a camera and a microphone.

A network interface 626 allows the node 600 to communicate with other computer systems via an electronic communications network 627. By way of example, the network 627 may be a wide area network and the node 600 may be on a local area network. The node may interface with the network 627 via a router 608, which may include a network address translator NAT. In some embodiments the node 600 itself may be a router, e.g., as described above with respect to FIG. 2D. The network interface 626 may include wired or wireless communication over local area networks and wide area networks such as the Internet. The node 600 may send and receive data and/or requests for files via one or more message packets 628 over the network 627. By way of example, the network interface 626 may include or be part of a network card, network adapter or network interface card (NIC), such as an Ethernet card. The network interface 626 may include computer hardware designed to allow the node 600 to communicate over the network 627. The network interface 626 may provides physical access to a networking medium and provide a low-level addressing system, e.g., through the use of MAC addresses. Consequently, with respect to the Internet Protocol stack, the network interface 626 may be regarded as both a physical layer device and a data link layer device.

The node 600 may further comprise a graphics subsystem 630, which may include a graphics processing unit (GPU) 635 and graphics memory 640. The graphics memory 640 may include a display memory (e.g., a frame buffer) used for storing pixel data for each pixel of an output image. The graphics memory 640 may be integrated in the same device as the GPU 635, connected as a separate device with GPU 635, and/or implemented within the memory 602. Pixel data may be provided to the graphics memory 640 directly from the CPU 601. Alternatively, the CPU 601 may provide the GPU 635 with data and/or instructions defining the desired output images, from which the GPU 635 may generate the pixel data of one or more output images. The data and/or instructions defining the desired output images may be stored in memory 602 and/or graphics memory 640. In an embodiment, the GPU 635 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 635 may further include one or more programmable execution units capable of executing shader programs.

The graphics subsystem 630 may periodically output pixel data for an image from graphics memory 640 to be displayed on a display device 650. The display device 650 may be any device capable of displaying visual information in response to a signal from the computer system 600, including CRT, LCD, plasma, and OLED displays. The node 600 may provide the display device 650 with an analog or digital signal. By way of example, the display 650 may include a cathode ray tube (CRT) or flat panel screen that displays text, numerals, graphical symbols, or images. In addition, the node 600 may include one or more audio speakers 652 that produce audible or otherwise detectable sounds. To facilitate generation of such sounds, the node 600 may further include an audio processor 655 adapted to generate analog or digital audio output from instructions and/or data provided by the CPU 601, memory 602, and/or storage 615. In the particular case of applications such as A/V chat or Voice over Internet Protocol (VoIP), it is sometimes desirable for the node 600 to include a graphical display device 650 and an audio speaker 652.

The components of the node 600, including the CPU 601, memory 602, support functions 620, data storage 615, user input devices 625, network interface 626, graphics subsystem 630 speaker 652 and audio processor 655 may be operably connected to each other via one or more data buses 660. These components may be implemented in hardware, software, firmware or some combination of two or more of these.

Embodiments of the present invention may solve a key issue in networking deployments related to NAT devices [routers that perform network address translation]. It is possible that a router with a fully specified behavior may be used to implement NAT behavior information discovery and distribution in a centralized way. It is possible that some of the functionality may be lost if the state of individual applications cannot be fully gleaned at such a router. However, additions to this mechanism may account for this deficiency, though perhaps with some associated overhead.

In embodiments of the present invention otherwise distinct, peer network nodes that are behind a common NAT may cooperate to cooperate to better solve the NAT traversal problem in a decentralized way. There are no existing solutions to the full range of issues that can occur with varying NAT device behavior that involve cooperation of multiple nodes on a local network.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. In a mobile device configured to communicate with one or more other devices over a network via one or more wireless access points, a method for facilitating traversal of a network address translator (NAT), the method comprising:
   estimating a direction of travel for the mobile device;
   using the estimated direction of travel to predict one or more wireless access points that the mobile device is likely to encounter; and
   a) determining information regarding behavior of one or more NATs associated with the predicted one or more wireless access points that the mobile device is likely to encounter with the mobile device; and storing the information in such a way that the information is retrievable by one or more other devices or using the information to traverse one or more of the NATs; or
   b) retrieving information regarding behavior of one or more NATs associated with the predicted one or more wireless access points that the mobile device is likely to encounter and using the information to traverse one or more of the NATs; or
   c) both a) and b).

2. The method of claim 1 wherein determining the information regarding the behavior of the one or more NATs includes determining a media access control (MAC) address for one or more of the NATs.

3. The method of claim 1 wherein determining the information regarding the behavior of the one or more NATs includes determining how many NATs there are between a given external IP address and another other device.

4. The method of claim 3 wherein determining how many NATs there are between a given external IP address and another device includes sending a datagram having a predetermined time to live and, if a time exceeded error is sent back to the node in response to the datagram, resending the datagram with an incremented time to live.

5. The method of claim 1 wherein the information regarding the behavior of one or more NATs includes a NAT type.

6. The method of claim 1 wherein the information regarding the behavior of one or more NATs includes geographical information relating to the NAT.

7. The method of claim 1 wherein storing the information includes distributing the information over a peer-to-peer network.

8. The method of claim 1 wherein storing the information in such a way that the information is retrievable by one or more other devices includes storing the information on a server that is accessible to the node and the other devices.

9. The method of claim 8 wherein the server is a common database server.

10. The method of claim 1 wherein a) further comprises storing information associated with the one or more NATs.

11. The method of claim 1 wherein b) further comprises retrieving information associated with the one or more NATs.

12. The method of claim 1 wherein b) includes retrieving information regarding behavior of one or more NATs from a central location that is accessible by the mobile device and the one or more other devices.

13. The method of claim 1 wherein the mobile device and the one or more other devices are behind the same NAT.

14. The method of claim 1 wherein the mobile device is a router that is accessible by the one or more other devices.

15. The method of claim 14 wherein storing the information in such a way that the information is retrievable by one or more other devices includes caching the information at the router.

16. The method of claim 1 wherein the information regarding the behavior of one or more NATs includes NAT behavior information, one or more available Simple Traversal of UDP through NAT (STUN) server addresses, one or more common database addresses, a number of active sessions via a NAT, a collective traffic load on a NAT or a value of a flag realizing atomicity of port prediction against a symmetric NAT.

17. The method of claim 1, wherein determining the direction of travel includes analyzing global positioning satellite (GPS) data or a wireless signal strength.

18. A mobile device, comprising:
processor;
a network interface coupled to the processor, the network interface being configured to allow the mobile device to communicate wirelessly with one or more other devices over a network via one or more wireless access points; and
one or more processor executable instructions that when executed by the processor cause the mobile device to:
estimate a direction of travel for the mobile device;
use the estimated direction of travel to predict one or more wireless access points that the mobile device is likely to encounter; and a) determine information regarding behavior of one or more NATs associated with the predicted one or more wireless access points that the mobile device is likely to encounter with the mobile device and store the information in such a way that the information is retrievable by one or more other devices or use the information to traverse one or more of the NATs; or
b) retrieve information regarding behavior of one or more NATs associated with the predicted one or more wireless access points that the mobile device is likely to encounter and using the information to traverse one or more of the NATs; or
c) both a) and b).

19. The device of claim 18 further comprising a memory location accessible by the mobile device for storing and/or retrieving information regarding behavior of one or more NATs.

20. The device of claim 18 wherein the mobile device is connected to one or more other devices in the network via a router that implements the NAT.

21. The device of claim 18 wherein the mobile device is a router connected to one or more other devices.

22. The device of claim 21 wherein the router implements the NAT.

23. The device of claim 18 wherein the information regarding the behavior of one or more NATs includes NAT behavior information, one or more available STUN server addresses, one or more common database addresses, a number of active sessions via a NAT, a collective traffic load on a NAT or a value of a flag realizing atomicity of port prediction against a symmetric NAT.

24. The device of claim 18 wherein the one or more instructions are configured to cause the mobile device to determine the direction of travel by analyzing global positioning satellite (GPS) data or a wireless signal strength.

* * * * *